HEATING DEVICE FOR ELECTRICAL ACTUATION

Original Filed April 14, 1970 4 Sheets-Sheet 1

INVENTORS
JAMES W. WELSH
BY FRED ADLER
ATTORNEY

HEATING DEVICE FOR ELECTRICAL ACTUATION

Original Filed April 14, 1970 4 Sheets-Sheet 2

INVENTORS
JAMES W. WELSH
BY FRED ADLER
J. Walk Bell
ATTORNEY

HEATING DEVICE FOR ELECTRICAL ACTUATION

Original Filed April 14, 1970 4 Sheets-Sheet 3

INVENTORS
JAMES W. WELSH
BY FRED ADLER
ATTORNEY

HEATING DEVICE FOR ELECTRICAL ACTUATION

Original Filed April 14, 1970 4 Sheets-Sheet 4

INVENTORS
JAMES W. WELSH
BY FRED ADLER
ATTORNEY

United States Patent Office

Re. 27,877
Reissued Jan. 8, 1974

27,877
HEATING DEVICE FOR ELECTRICAL ACTUATION

James W. Welsh, Summit, N.J., and Fred Adler, Westbury, N.Y., assignors to Standard Motor Products, Inc., Long Island City, N.Y.

Original No. 3,657,518, dated Apr. 18, 1972, Ser. No. 28,326, Apr. 14, 1970. Application for reissue Oct. 2, 1972, Ser. No. 293,805
Int. Cl. H05b *3/06*
U.S. Cl. 219—536 17 Claims

Matter enclosed in heavy brackets [ ] appears in the original patent but forms no part of this reissue specification; matter printed in italics indicates the additions made by reissue.

ABSTRACT OF THE DISCLOSURE

A heating device for electrical actuation is shown which includes an elongated convoluted support and an insulated electrical resistance wire disposed upon the support. A base member optionally underlies the support and is secured thereto. The support may be formed alternatively of a pair of superimposed members, a lateral inturned portion, or a pair of spaced lateral inturned portions or folded portions. Flange portions may also be optionally provided upon the base member for stiffening purposes.

DESCRIPTION OF THE INVENTION

This invention relates to a heating device for electrical actuation which is simple and inexpensive in construction, requires a relatively small amount of labor to make and is simple, efficient and foolproof in operation.

The invention may be briefly described as comprising, in combination, an elongated, convoluted support (preferably made of thin (.001"-.014") heat conductive material, such as steel, nickel alloy, copper, aluminum, or other metal and electrically actuated heating means (preferably insulated resistance wire) longitudinally disposed upon the support. A base member is preferably secured to the support, which base member may either be flexible or rigid. Various means are provided to secure the parts to one another, including welding, striking a portion of one member out of said member and joining it to the adjacent member (stitching), brazing etc.

There are various subsidiary features of the heating device of this invention which will be subsequently detailed in this specification. These subsidiary features also improve the operation of the device of this invention.

The above constitutes a brief description of this invention and of some of the objects and advantages thereof. Other objects and advantages of this invention will become apparent to the reader of this specification as this description proceeds.

The invention will now be further described by reference to the accompanying drawings, which are made a part of this specification.

FIG. 1 is a side elevational view of one form of heating device for electrical actuation made in accordance with this invention.

This form of invention includes a base member which is non-rigid so that the heating element can be formed into a substantially curled pattern.

Figure 1:
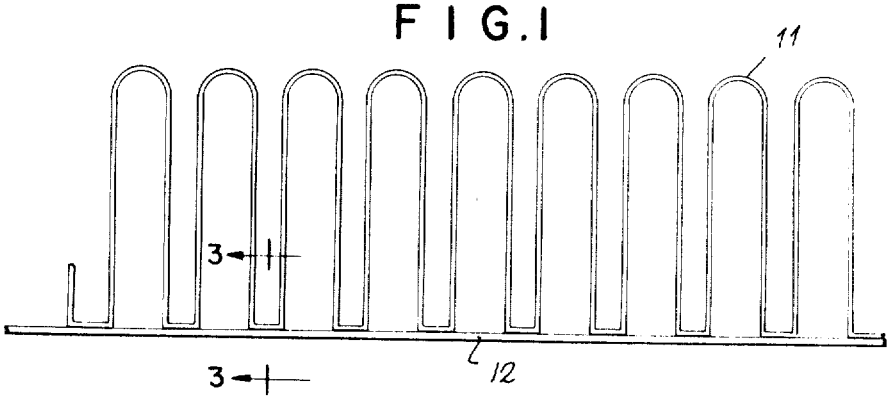
Figure 2:
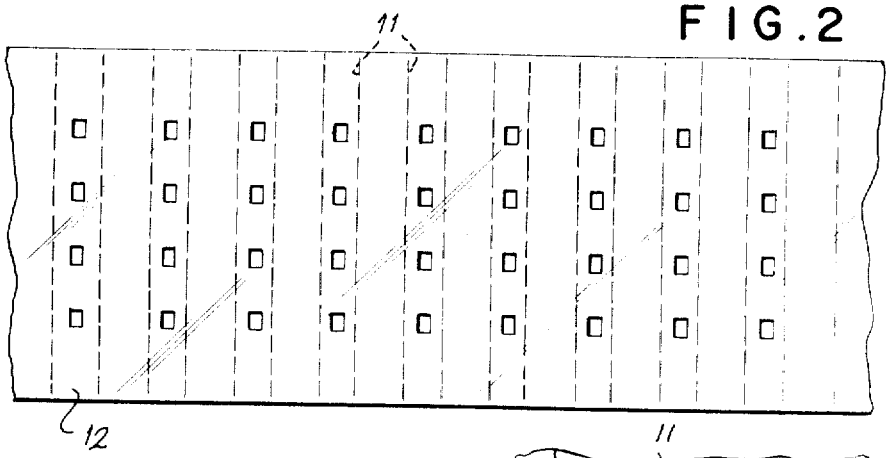
FIG. 2 is a bottom plan view of the form of heating device as shown in FIG. 1.
Figure 3:
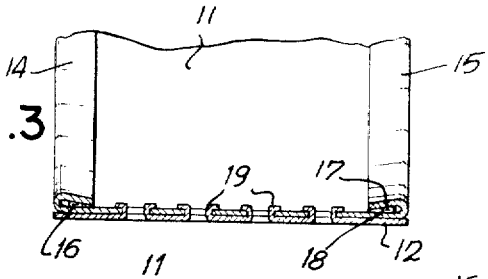
FIG. 3 is a cross-sectional view of a portion of the form of device shown in FIG. 1 taken along lines 3—3 of FIG. 1. In this modification, the base member is secured to the convoluted support by means of portions struck out of one and secured to the adjacent member (stitching).
Figure 5:
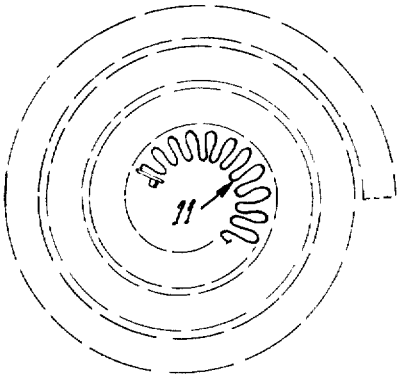
FIG. 5 is a diagrammatic side view of the form of invention shown in FIG. 1 showing the manner in which the base member and the convoluted support member may be curled so as to fit the device into a restricted space.

The invention will now be further described by reference to the specific forms thereof as shown in the accompanying drawings. In this connection, however, the reader is cautioned to note that such specific forms of this invention as indicated upon the specification herein are for illustrative purposes and for purposes of example only. Various changes and modifications could obviously be made within the spirit and scope of this invention.

The invention will now be described in detail by first referring to the form of invention shown in FIGS. 1 through 5. This form of invention includes a convoluted support member 11 to which a base 12 is secured. The convoluted support member includes a plurality of laterally disposed inturned portions 14 and 15 within which the heating members 16 and 17 are disposed. Heating members 16 and 17 are resistance wires which include a wire body portion 13 surrounded by an insulating envelope 18. The insulating envelope is preferably a thin insulating material such as polyimide film and the resistance wire is preferably an iron ribbon-chromium-aluminum alloy. However this specific description of the members is not intended to be set forth as a limitation but merely by way of example.

Convoluted support member 11 is preferably made of a heat conductive material such as sheet aluminum, sheet steel or the like.

Figure 4:
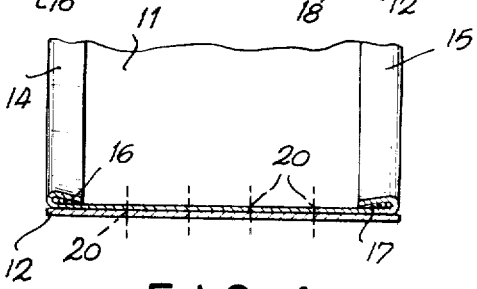
FIG. 4 is a cross-sectional view similar to that of FIG. 3 but wherein the base member is secured to the convoluted support member by welding, with the welding points indicated by dotted lines.
Figure 6:
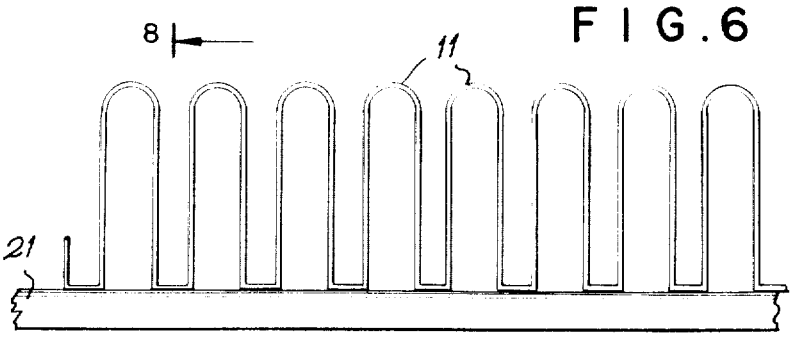
FIG. 6 is a side elevational view of an alternative form of the heating device of this invention. In this form of device the base member is rigid and the rigidity is improved by the use of spaced lateral downwardly depending members.
Figure 7:
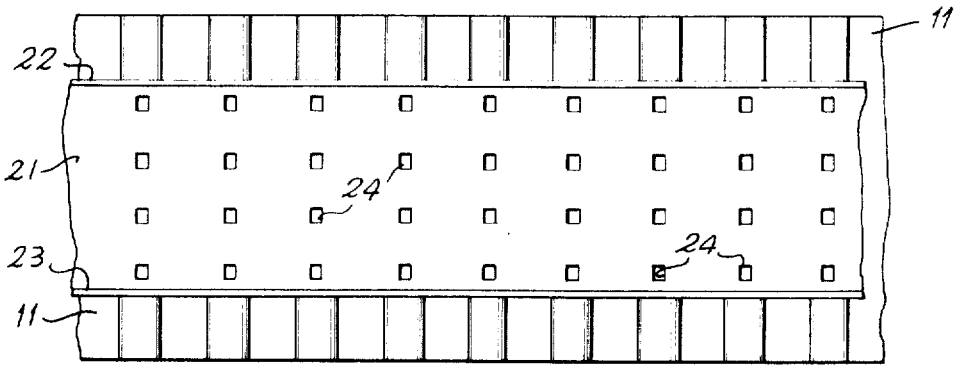
FIG. 7 is a bottom plan view of the form of device shown in FIG. 6.
Figure 10:
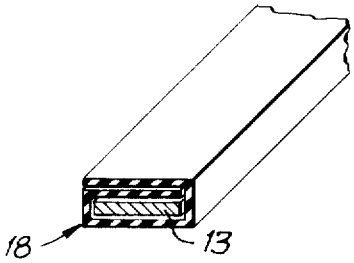
FIG. 10 is a detail perspective view of the manner in which the insulating envelope is wrapped about the resistance wire utilized as the heating element of the device of this invention.
Figure 8:
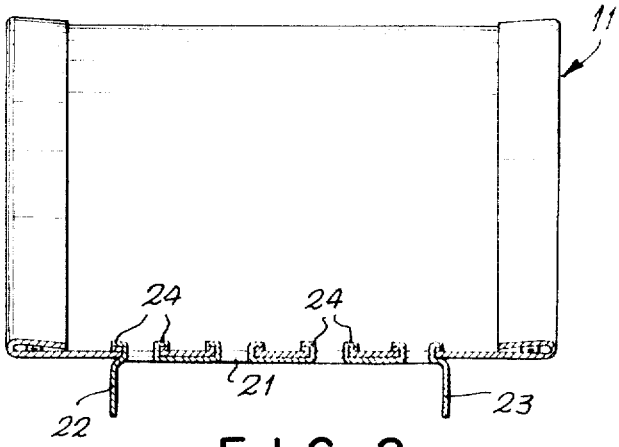
FIG. 8 is a detail cross-sectional view of the form of invention shown in FIG. 6 taken along lines 8—8 of FIG. 6. In this view the base member is secured to the convoluted support member by means of portions struck out of one member and secured to the other.
Figure 9:
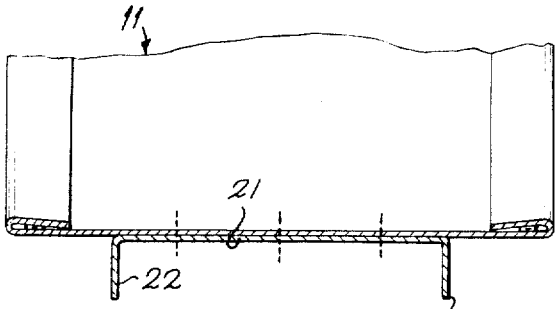
FIG. 9 is a cross-sectional view similar to that of FIG. 8 but showing the base member secured to the convoluted support member by means of welding with the welding points indicated by dotted lines.

Base member 12 is secured to convoluted support member 11 either by striking a portion 19 out of member 12 and securing it to member 11 or by welding member 12 to member 11 as shown at points 20 in FIG. 4.

Now referring to the alternative construction of this invention as shown in FIGS. 6, 7, 8 and 9, support member 11 is similar in form to the support member 11 shown in FIGS. 1 through 5, with the other elements, other than base member 12, being similar. However, in this variation, base member 21 (corresponding to base member 12 in the form of invention shown in FIGS. 1 through 5) is a rigid structure and includes a pair of oppositely laterally disposed downwardly depending portions 22 and 23. Again base member 21 is secured to convoluted support 11 through a number of portions 24 each of which is struck out of member 21 and is secured to member 11 (stitching).

Figure 12:
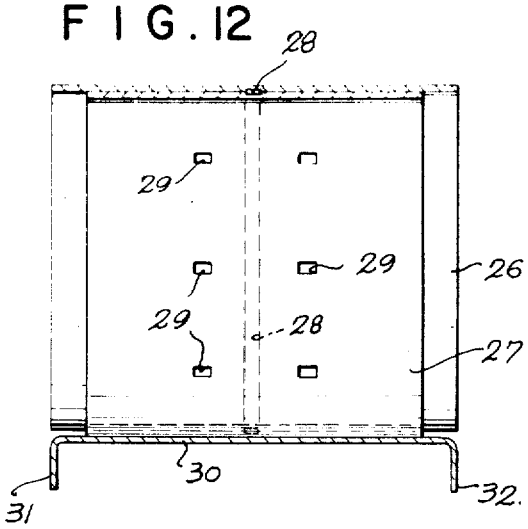
FIG. 12 is a cross-sectional view of the form of invention shown in FIG. 11 taken along lines 12—12 of FIG. 11.
Figure 13:
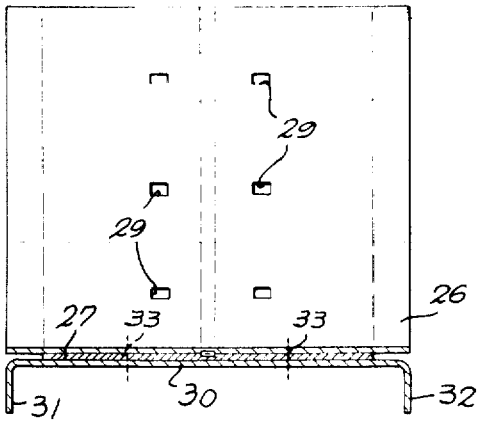
FIG. 13 is a cross-sectional view of the form of invention shown in FIG. 11 taken along lines 13—13 of FIG. 11 and showing the base member welded to the convoluted support with the welding points indicated by dotted lines.
Figure 11:
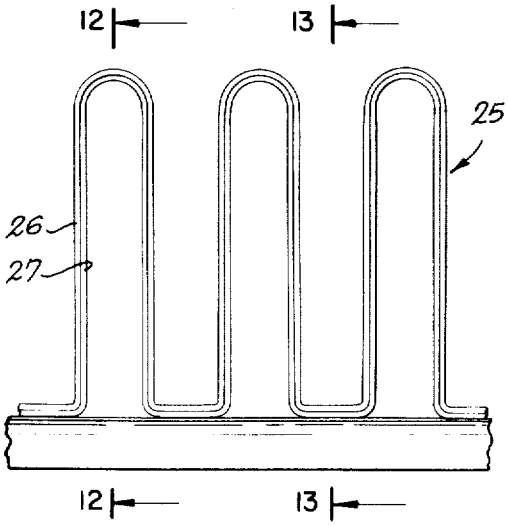
FIG. 11 is a side view of a further alternative form of this invention utilizing a rigid base member and a pair of superimposed members constituting the support.

The further alternative structure shown in FIGS. 11, 12 and 13 includes a convoluted support 25, which is formed of a pair of superimposed members 26 and 27. It is noted that in this variation member 26 is wider than member 27.

Between members 26 and 27 a resistance wire 28 is longitudinally disposed and the position of this wire along the convoluted support is indicated by dotted lines in FIGS. 12 and 13.

Member 26 is secured to member 27 by striking out portions of one of the members and securing these portions to the adjacent member (stitching). The struck out portions are indicated at 29. The base member 30 is of a rigid type and includes a plurality of laterally spaced members 31 and 32 which are downwardly depending.

Base 30 is secured to support 25 by means of welding indicated at 33.

Figure 14:
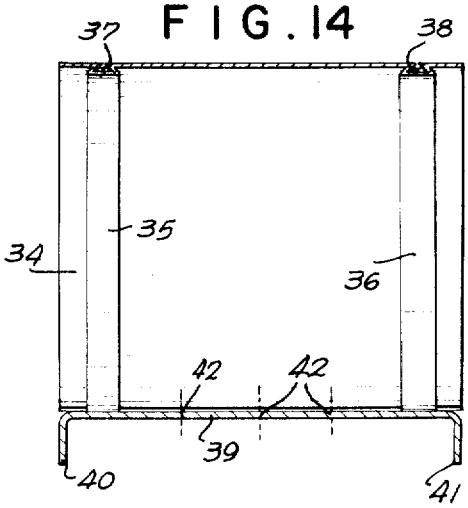
FIG. 14 is a cross-sectional view similar to that of FIG. 13 but showing an alternative structure wherein a plurality of spaced heating members are utilized rather than a single heating element and the heating members are imbedded in folded portions defined in the support.

FIG. 14 shows a further alternative method of securing the resistance wire to the convoluted support. In this view the convoluted support 34 is formed with a pair of spaced folded holding portions 35 and 36 and within each of these portions an insulated resistance wire 37 and 38 is longitudinally disposed. The base member 39 having downwardly depending portions 40 and 41 is secured to support 34 by welding indicated at point 42.

Figure 15:
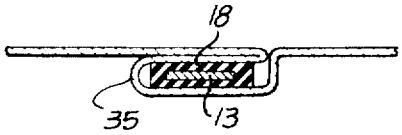
FIG. 15 is a detail cross-sectional view of a heating member and associated structure showing another alternative method of supporting the heating element by a different type of folded portion defined in the support.
Figure 17:
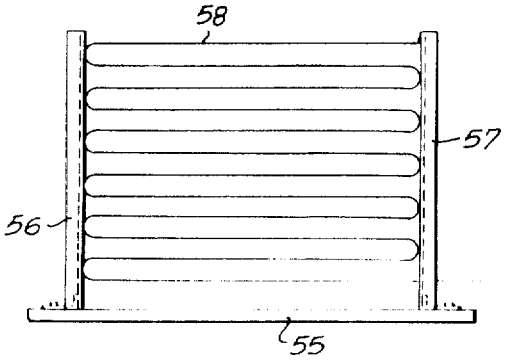
FIG. 17 is a somewhat diagrammatic side elevational view showing a still further modification of the heating device of this invention.

FIG. 15 shows a further variation of the spaced holding portions which can be used to hold a resistance wire. In this variation the convoluted support is "crimped" about the resistance wire to hold the same in position.

Figure 16:
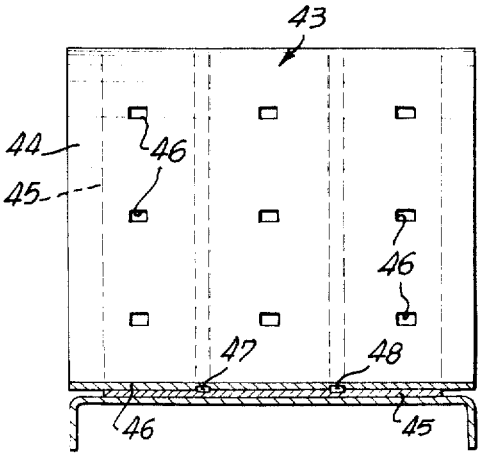
FIG. 16 is a cross-sectional view similar to that of FIG. 13 but showing an alternative structure wherein a plurality of spaced heating members are longitudinally disposed across the convoluted support rather than a single member, as shown in FIG. 13.

In FIG. 16 a further alternative construction of a convoluted support is shown. In this figure, support 43 is also formed with a pair of superimposed members 44 and 45, with member 45 being longer than member 44. Portions of one member are struck out and are secured to the adjacent member and are shown in FIG. 16 at 46. In this variation, a plurality of insulated resistance wires 47 and 48 are disposed between members 44 and 45 and extend longitudinally across support 43. The position of wires 47 and 48 are indicated by the dotted lines in FIG. 16.

Figure 18:
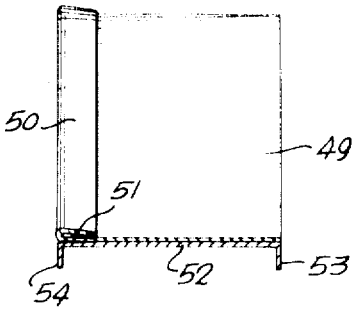
FIG. 18 is a detail end elevational view, partly in section, of a further alternative construction of the heating device of this invention.
Figure 19:
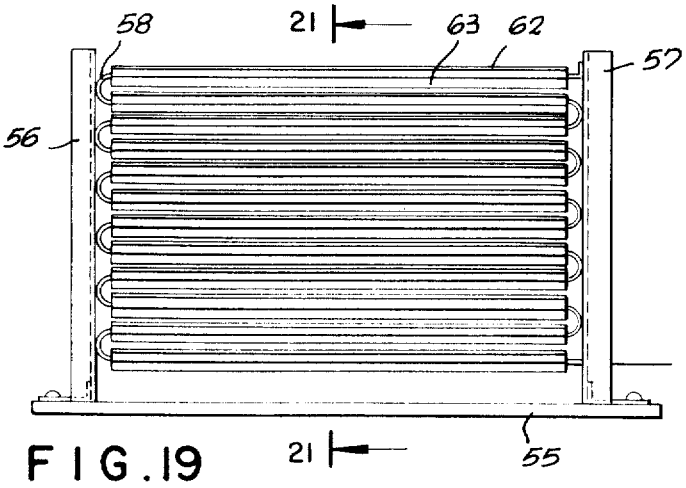
FIG. 19 is a side elevational view of a form of heating device of this invention similar to that diagrammatically shown in FIG. 17 showing the stiffening flanges that can be employed.
Figure 21:
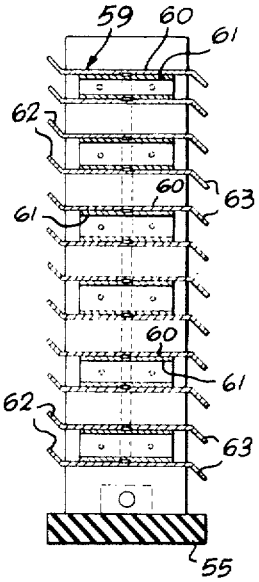
FIG. 21 is a cross-sectional view of a portion of the structure shown in FIG. 19 taken along lines 21—21 of FIG. 19.
Figure 20:
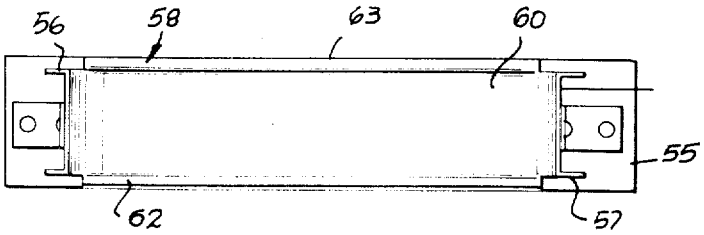
FIG. 20 is a top plan view of the structure shown in FIG. 19.

In the variations shown in FIG. 18, convoluted support 49 bears a single lateral inturned portion 50 within which an insulated resistance wire 51 is disposed. Base 52 is rigid and includes spaced laterally downwardly depending portions 53 and 54.

In the variations shown in FIGS. 17, 19, 20 and 21, the heater support 55 is shown which includes a pair of lateral upstanding members 56 and 57. A convoluted heating member 58 is disposed between supports 56 and 57 and secured thereto. Member 58 has a convoluted support portion 59 which is formed of a pair of superimposed members 60 and 61. Member 60 is formed with a plurality of oppositely offset longitudinal flanges 62 and 63. This structure produces a relatively rigid heating element, very efficient in operation and at minimum cost.

Manufacture of the heating device of this invention is relatively simple and the entire manufacturing process lends itself to automation.

In operation the resistance wires are connected to a source of electrical power which, also conventionally, will cause resistance heating to occur and thereby operate the device involved.

The foregoing sets forth the manner in which the objects of this invention are achieved.

What is claimed is:

1. An electrically actuated heating device comprising, in combination, a pair of superimposed [deformable] substantially planar metallic members, a heat-producing resistance electrically conductive member having insulation surrounding the same longitudinally disposed between said metallic members and spaced from the sides thereof, said metallic members being secured to one another and retaining said heat-producing member therebetween by striking out portions of one member and securing said struck out portions to the other member, said metallic members being [deformed into] *in* convoluted form.

2. A device as described in claim 1 including an additional heat producing resistance electrically conductive member having insulation surrounding the same disposed parallel to said first-named heat producing member.

3. A device as described in claim 2 including a base member secured to said metallic members.

*4. An electrically actuated heating device comprising, in combination, a pair of superimposed elongate substantially planar metallic members, a heat-producing electrically conductive resistance member having insulating means surrounding the same longitudinally disposed between said metallic members and means for securing said metallic members to one another, said metallic members being in convoluted form.*

*5. The device claimed in claim 4 wherein said metallic members are secured to one another by welding.*

*6. The device claimed in claim 4 wherein said metallic members are secured to one another by brazing.*

*7. The device claimed in claim 4 wherein said planar metallic members have a thickness of from 0.001 to 0.014 inch.*

*8. An electrically actuated heating device comprising, in combination, a pair of superimposed elongate substantially planar metallic members overlying one another, a heat-producing elongate rectangular electrically conductive resistance member having thin sheet insulation surrounding the same and longitudinally disposed between said metallic members, said insulation being wrapped at*

*least once about said rectangular member and thence overlying one of the wrapped sides thereof, and means for securing said metallic members to one another, said metallic members being in convoluted form.*

*9. The device claimed in claim 8 wherein said insulation overlies one of the wrapped sides of greater width of said electrically conductive member.*

*10. The device claimed in claim 9 wherein said planar metallic members have a thickness of from 0.001 to 0.014 inch.*

*11. An electrically actuated heating device comprising, in combination, a pair of elongate substantially planar metallic members overlying one another, a heat-producing elongate rectangular electrically conductive resistance member having thin sheet insulation surrounding the same and longitudinally disposed between said metallic members, said insulation consisting of a single sheet having a longitudinal axis parallel to the longitudinal axis of said resistance member, said insulation being wrapped at least once about said resistance member in a direction perpendicular to said longitudinal axis thereof, and means for securing said metallic members to one another, said metallic members being in convoluted form.*

*12. A heater assembly and base means secured thereto, said assembly including an electrically insulated resistance heating element and support means comprised of convolute elongate substantially planar heat-conductive sheet material having opposed inner surfaces defining an enclosure for said heating element and having outer surfaces, at least one of said support means outer surfaces being secured to said base means exclusively at longitudinally spaced extents of said support means outer surfaces, remaining extents of said support means outer surface being displaced from said support means.*

*13. The invention claimed in claim 12 wherein said base means is secured to said support means exclusively at the roots of the convolutions of said convolute sheet material thereof.*

*14. The invention claimed in claim 12 wherein said heating element comprises an elongate rectangular electrically conductive resistance member having thin sheet insulation surrounding the same and longitudinally disposed in said enclosure, said insulation consisting of a single sheet having a longitudinal axis parallel to the longitudinal axis of said resistance member, said insulation being wrapped at least once about said resistance member in a direction perpendicular to said longitudinal axis thereof.*

*15. A heater assembly and at least one base secured thereto, said assembly including:*

*(a) a first convolute elongate heat-conductive support member having an inner surface and an outer surface, said outer surface being secured exclusively at longitudinally spaced extents thereof to said one base;*

*(b) an electrically insulated resistance heating element having a width less than the width of said first support member and including an expanse of length common with that of said first support member and juxtaposed throughout such common length with said inner surface of said first support member; and*

*(c) a second convolute elongate heat-conductive support member including an expanse of length common with that of said first support member, having an inner surface juxtaposed throughout such common length with said heating element and secured in such common length to said first support member inner surface and therewith defining an enclosure for said heating element.*

*16. The invention claimed in claim 15 wherein said one base is secured to said first support member outer surface exclusively at the roots of the convolutions thereof.*

*17. The invention claimed in claim 15 wherein said heating element comprises an elongate rectangular electrically conductive resistance member having thin sheet insulation surrounding the same and longitudinally disposed between said support members, said insulation consisting of a single sheet having a longitudinal axis parallel to the longitudinal axis of said resistance member, said insulation being wrapped at least once about said resistance member in a direction perpendicular to said longitudinal axis thereof.*

References Cited

The following references, cited by the Examiner, are of record in the patented file of this patent or the original patent.

UNITED STATES PATENTS

| | | | |
|---|---|---|---|
| 2,432,400 | 12/1947 | Eger | 219—540 |
| 2,777,300 | 1/1957 | Palmer | 219—530 UX |
| 2,971,073 | 2/1961 | Eisler | 338—212 X |
| 3,041,569 | 6/1962 | Werker | 219—553 X |
| 3,043,942 | 7/1962 | Wickwire III et al. | 219—550 |
| 3,086,187 | 4/1963 | Duggan et al. | 338—283 |
| 3,205,342 | 9/1965 | Smith et al. | 219—549 |
| 3,265,865 | 8/1966 | Hager, Jr. | 219—549 |
| 3,453,417 | 7/1969 | Hummel | 219—536 |
| 3,522,415 | 8/1970 | Eisler | 219—528 |
| 3,539,767 | 11/1970 | Eisler | 219—213 |

VOLODYMYR Y. MAYEWSKY, Primary Examiner

U.S. Cl. X.R.

219—530, 540, 542, 549, 552; 330—212, 283